United States Patent [19]
Sointula

[11] Patent Number: 6,091,780
[45] Date of Patent: Jul. 18, 2000

[54] TRANSMITTING AND RECEIVING RADIO SIGNALS

[75] Inventor: Erkka Sointula, Marynummi, Finland

[73] Assignee: Nokia Mobile Phones, Ltd., Salo, Finland

[21] Appl. No.: 08/815,388

[22] Filed: Mar. 11, 1997

[30] Foreign Application Priority Data

Mar. 12, 1996 [GB] United Kingdom .................... 9605240

[51] Int. Cl.$^7$ .......................... H04L 27/00; H04L 27/04; H03K 9/00; H03K 7/10
[52] U.S. Cl. ........................ 375/259; 375/295; 375/316; 332/108
[58] Field of Search .................................... 375/259, 295, 375/316; 332/106, 108, 119, 151; 329/316, 323, 341, 348, 358, 343

[56] References Cited

U.S. PATENT DOCUMENTS

| | | | |
|---|---|---|---|
| 5,008,900 | 4/1991 | Critchlow et al. | 375/222 |
| 5,160,900 | 11/1992 | Visuri | 331/18 |
| 5,291,474 | 3/1994 | Ikonen et al. | 370/30 |
| 5,301,367 | 4/1994 | Heinonen | 455/76 |
| 5,444,415 | 8/1995 | Dent et al. | 375/274 |
| 5,631,655 | 5/1997 | Posey et al. | 342/162 |
| 5,732,333 | 3/1998 | Cox et al. | 375/296 |
| 5,841,814 | 11/1998 | Cupo | 375/321 |
| 5,867,535 | 2/1999 | Phillips et al. | 375/295 |

FOREIGN PATENT DOCUMENTS

| | | |
|---|---|---|
| 0 032 253 | 7/1981 | European Pat. Off. . |
| 0 032 253 A1 | 7/1981 | European Pat. Off. . |
| 0 651 520 A2 | 5/1995 | European Pat. Off. . |
| 2 270 447 | 5/1994 | United Kingdom . |
| 2 235 854 | 6/1994 | United Kingdom . |
| 2 266 646 | 6/1994 | United Kingdom . |
| 2 277 010 | 10/1994 | United Kingdom . |
| 2 283 871 | 5/1995 | United Kingdom . |

*Primary Examiner*—Stephen Chin
*Assistant Examiner*—Albert Park
*Attorney, Agent, or Firm*—Perman & Green, LLP

[57] ABSTRACT

In a satellite mobile telephone a radio signal is transmitted by firstly generating (602) a digital input signal. The digital input signal is processed (703) in combination with a digital modulating signal (704) to produce a digital intermediate signal. The digital intermediate signal is converted (705) into an analog intermediate signal and said analog intermediate signal is processed (706) in combination with an analog modulating signal to produce a radio frequency output signal. Similarly, during reception, a received signal is processed in combination with an analog demodulating signal to produce an analog intermediate signal. The analog intermediate signal is sampled to produce a digital intermediate signal and said digital intermediate signal is processed in combination with a digital demodulating signal so as to select a transmitted channel. By performing processors partially in the analog domain and partially in the digital domain, it is possible to achieve rapid phase lock with a relatively narrow channel spacing.

10 Claims, 12 Drawing Sheets

TRANSMITTING AND RECEIVING RADIO SIGNALS

The present invention relates to transmitting and receiving radio signals.

INTRODUCTION

Radio signals may be generated or selected by means of a tuned circuit comprising inductive and capacitive elements, typically a coil and a capacitor. The combination of these elements connected in parallel or in series has a characteristic resonant frequency, that may be used to define the frequency of transmission or reception of the radio circuit. Modification of either of these components results in a change in the resonant frequency. Historically, a continuously variable capacitor has been used to tune over a particular waveband.

More recently new methods for modifying the characteristic resonant frequency of tuned circuits have been developed. In particular, the replacement of the variable capacitor with a varicap diode, also known as a varactor, enables the tuned circuit to be controlled by a voltage. The varicap diode is a reversed biased diode and by modifying the magnitude of a reverse voltage across the diode, the depletion layer, which prevents conduction, varies in thickness and acts as a variable capacitor.

In a tuned circuit that includes a varicap diode, the relationship between control voltage and resonant frequency is neither convenient nor particularly stable. Accurate control of resonant frequency is accomplished by including the tuned circuit in a radio frequency oscillator which forms part of a phase-locked loop. The output from the radio frequency oscillator may then be supplied to transmission or reception circuitry in order to define the frequency of transmitted or received radio signals.

SUMMARY OF THE INVENTION

According to a first aspect of the present invention, there is provided a method of transmitting a digital input signal over a radio channel, comprising steps of: processing said digital input signal in combination with a digital modulating signal to produce a digital intermediate signal; converting said digital signal into an analog intermediate signal; and processing said analog intermediate signal in combination with an analog modulating signal to produce a radio frequency output signal, wherein the frequency of said digital modulating signal and the frequency of said analog modulating signal are adjusted to change the frequency of said output signal.

According to a second aspect of the present invention, there is provided a method of receiving the radio frequency signal, comprising steps of: processing said signal in combination with an analog demodulating signal to produce an analog intermediate signal; sampling said analog intermediate signal to produce a digitized intermediate signal; and processing said digital intermediate signal in combination with a digital demodulating signal to select a transmission channel, wherein the frequency of said digital demodulating signal and the frequency of said analog demodulating signal are both adjusted to accommodate changes in said received signal.

Preferably, the intermediate signal is processed in combination with an additional analog demodulating signal before being sampled.

Preferably, the resolution of the analog modulating or demodulating signal is wider than a channel spacing to facilitate rapid frequency adjustments and individual channels are selected by a finer frequency resolution during the digital processing step.

According to a third aspect of the present invention there is provided apparatus for transmitting a digital input signal over a radio channel, comprising: processing means for processing said digital input signal in combination with a digital modulating signal to produce a digital intermediate signal; converting means for converting said digital intermediate signal into an analog intermediate signal; and processing means for processing said analog intermediate signal in combination with an analog modulating signal to produce a radio frequency output signal, including means arranged to adjust the frequency of said digital modulating signal and arranged to adjust the frequency of said analog modulating signal so as to change the frequency of said output signal.

According to a fourth aspect of the present invention there is provided radio frequency receiving apparatus, comprising: processing means for processing a received signal in combination with an analog demodulating signal to produce an analog intermediate signal; sampling means for sampling said analog intermediate signal to produce a digital intermediate signal; and processing means for processing said digital intermediate signal in combination with a digital demodulating signal to select a transmission channel, including means for adjusting the frequency of said analog demodulating signal and means for adjusting the frequency of said digital demodulating signal to accommodate variations in the frequency of said received signal.

In a preferred embodiment, the apparatus includes means for processing said intermediate signal in combination with an additional analog demodulating signal before said intermediate signal is sampled. Preferably, the resolution of the analog modulating signal or the analog demodulating signal is wider than a channel spacing, to facilitate rapid frequency adjustments; and individual channels are selected by a finer frequency resolution by the digital processing apparatus. Radio signals may be susceptible to Doppler shifts and Doppler shift compensation may be provided by adjusting the frequency of the digital modulating or digital demodulating signals in the digital signal processing domain.

THE PREFERRED EMBODIMENT

Figures 1A, 1B:
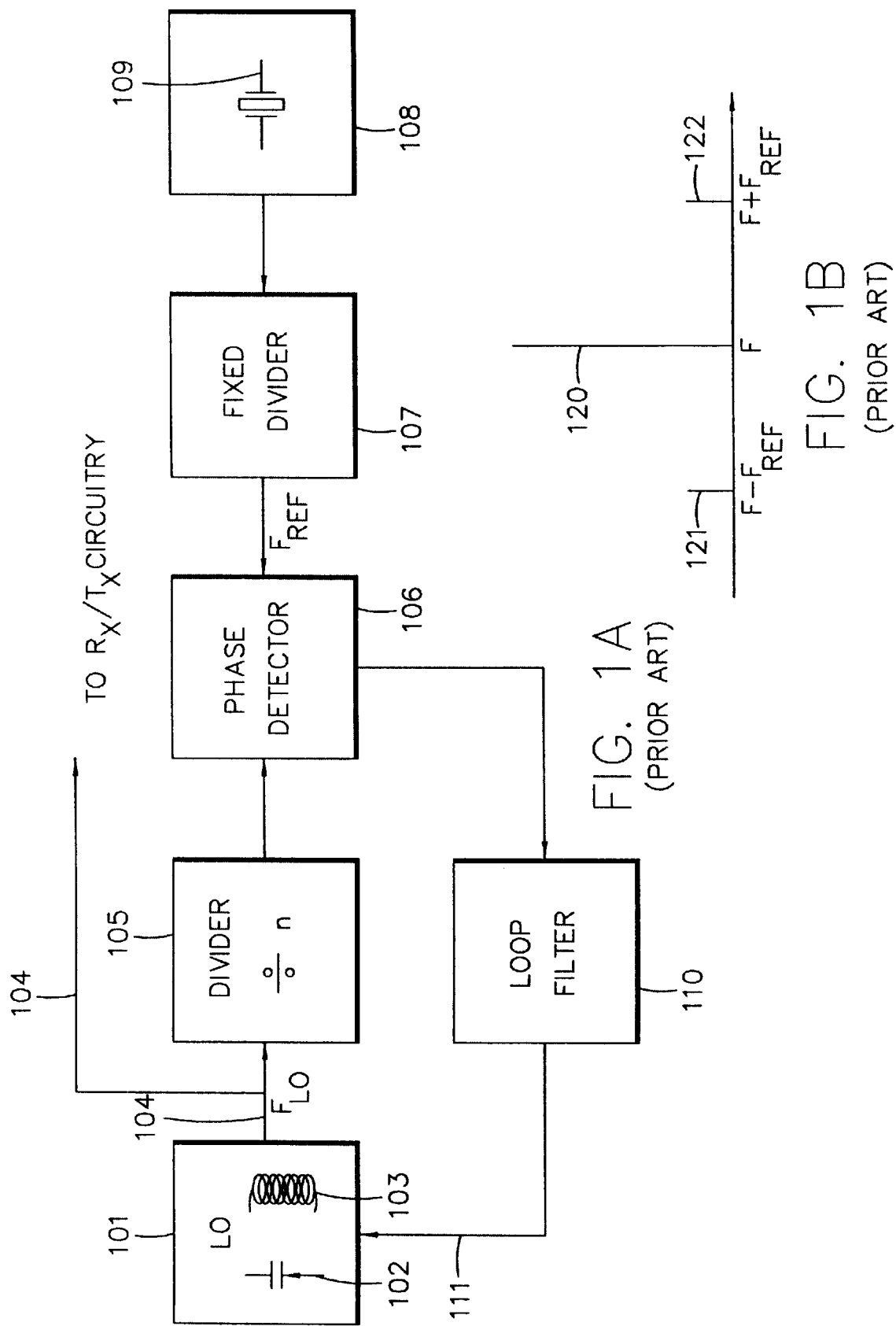
FIG. 1 shows the block diagram of the general principles involved in radio frequency synthesis.

The invention will now be described by way of example only, with reference to the drawings identified above.

A radio frequency phase-locked loop is shown in FIG. 1. A radio frequency oscillator 101 contains a tuned circuit, having a resonant frequency defined by a varicap diode 102 and an inductor 103. The oscillator 101 is typically of the type known as a Hartley or Colpitts oscillator and a signal 104 is generated having a frequency FLO defined by the resonant frequency of the tuned circuit.

The oscillator output 104 is supplied to a divider 105, which divides the oscillator frequency, FLO, by an integer value, n. The divided frequency is supplied to a first input of a phase detector 106.

A reference oscillator 108 consists of a temperature-compensated crystal oscillator, having a quartz crystal 109. This oscillates at a fixed known frequency, which is divided by a fixed factor in the fixed divider 107. The output from the fixed divider 107 is known as the reference frequency, FREF, and is supplied to a second input of the phase detector 106.

The phase detector generates an output voltage dependent on the difference in phase between its two inputs. This is supplied to a low pass loop filter 110, the output voltage 111 of which being dependent on the difference in phase between the two signals supplied to the phase detector 106. The output 111 from the loop filter 110 supplies a control voltage to the varicap diode 102 in the oscillator 101. The loop filter 110 generates a signal which pulls the phase and frequency FLO of the oscillator 101 to a value, which after division by n in the variable divider 105, is equal to the phase and frequency of FREF, from the fixed divider 107.

Thus a classic phase-locked loop is formed, with the frequency FLO of the oscillator 101 being controlled by the integer, n, used in divider 105, and the channel spacing between increments of n being defined by the value of FREF. This arrangement illustrates the basic concepts used in a radio frequency synthesizer, more generally known as a radio frequency phase-locked loop.

Unfortunately the programmable divider 105 cannot operate at input frequencies of greater than a few tens of megahertz, without raising cost and power consumption to unacceptable levels. A possible solution is to pre-divide the signal 104 by some fixed value using a fixed high speed divider. This technique is known as prescaling. This creates an additional problem in that FREF must be divided by the same amount, since the channel spacing is now equal to FREF multiplied by the prescaling factor.

In phase-locked loop literature, the classic problem is feed-through of the FREF signal from the fixed divider 107, through the phase detector 106, to the signal 111 supplied to the oscillator 101. Removal of FREF from the output of the phase detector 106 is performed by the loop filter 110. However, if FREF is reduced to one-tenth of the channel spacing, the loop filter's low pass cutoff frequency must similarly be reduced by a factor of ten. The consequence of this is an increase in the loop settling time by a factor of ten. This may lead to long settling times, rendering the circuit useless when techniques such as fast frequency hopping are to be used.

The problem with the arrangement in FIG. 1A is further explained in FIG. 1B. Without extreme filtering, due to radio frequency feed-through, sidebands 121 and 122 are imposed on the output 104 from oscillator 101, which has a centre frequency 120. These sidebands will degrade or distort reception of the desired channel by adding unwanted modulation components. Furthermore, selectivity of adjacent reception channels will be reduced. A lower cut-off frequency could be used for the loop filter 110, in order to reduce the amplitudes of the sidebands 121 and 122, but this would result in an increase in the loop settling time. Thus narrow channel spacing and fast settling time are contradictory requirements, as is known in the art.

Figure 2:
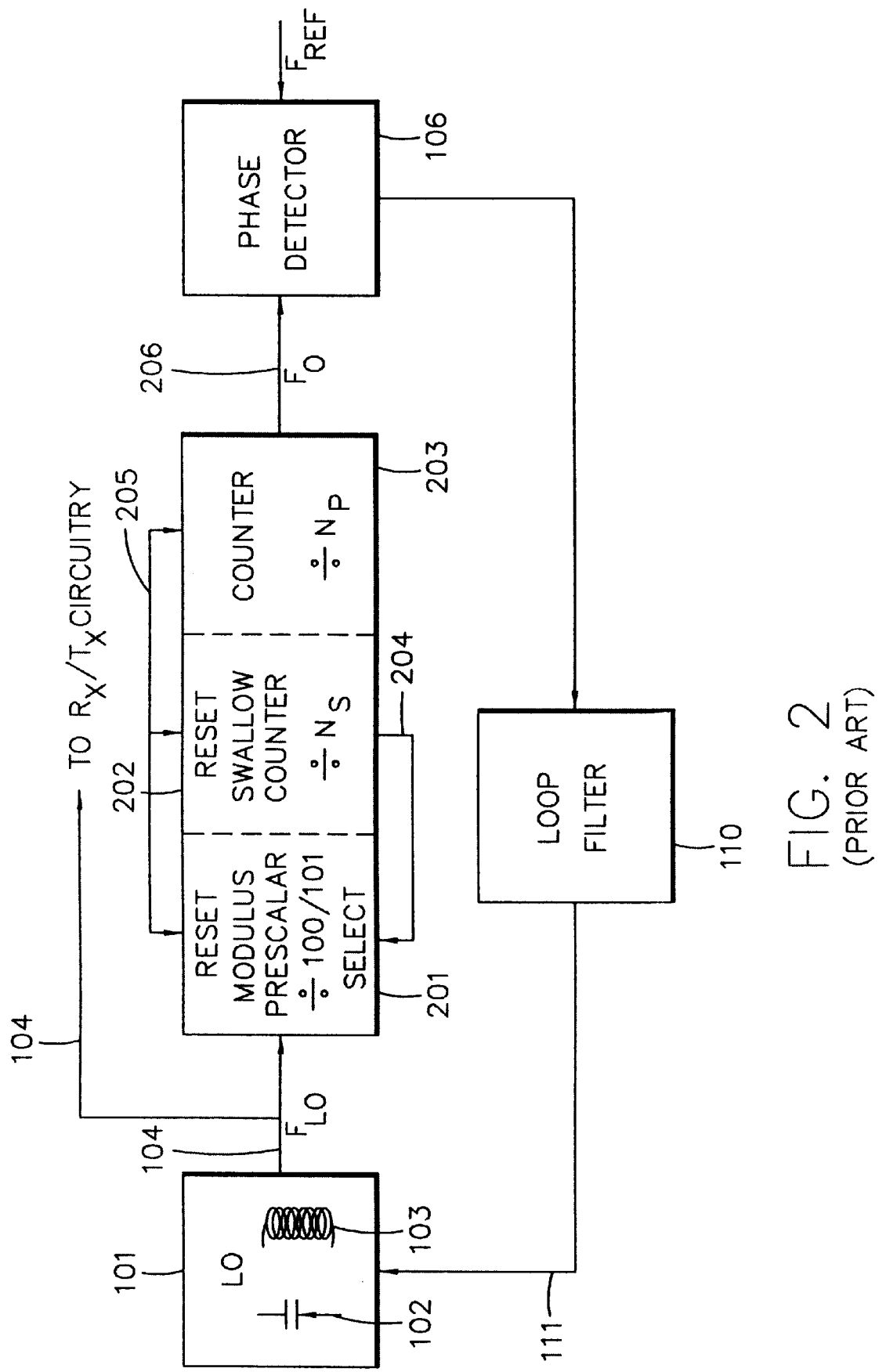
FIG. 2 shows an improved method of radio frequency synthesis.

There is a known technique for allowing FREF to equal the channel spacing while maintaining low cost and power consumption. FIG. 2 details a frequency synthesizer similar to that shown in FIG. 1A, where the integer divider 105 is replaced by a more complex arrangement. A dual modulus prescaler 201 divides the frequency FLO of the output from the oscillator 101 by, for example, either one hundred or one hundred and one, depending on a selecting signal 204. The resulting divided frequency is supplied to both a Swallow counter 202, which divides by integer NS, and a programmable counter 203, which divides by integer NP. In known systems, other pairs of division constants may be used, such as ten and eleven, thirty and thirty-one, depending on the degree of prescaling that is required.

The resulting combination performs a process known as Swallow Counting. Initially the dual modulus prescaler 201 is set to divide the output 104 of oscillator 101 by one hundred and one. Furthermore, the Swallow counter 202 is initialized to a value of NS, and the counter 203 is initialized to a value of NP, which must be greater than the value of NS for the system to work properly. After the first one hundred and one pulses have been supplied to the dual modulus prescaler 201, the Swallow counter 202 decrements its value by one, and the counter 203 also decrements its value by one.

The dual modulus prescaler 201 continues to decrement the Swallow counter 202 and the counter 203 every one hundred and one pulses from signal 104, until the Swallow counter 202 contains zero. Upon reaching zero, the Swallow counter 202 generates a selecting signal 204, causing the dual modulus prescaler 201 to divide by one hundred, instead of one hundred and one. Also, after reaching zero, the Swallow counter stops counting, but the counter 203 continues, and is now decremented once for every one hundred pulses from the output 104 from the oscillator 101. This continues until the value of the counter 203 reaches zero, when the contents of the two counters 202 and 203 are reset to their initial values of NS and NP respectively, and the dual modulus prescaler 201 starts dividing by one hundred and one again.

The output 206 from the counter 203 has frequency FO, which is given by:

$$FO = FLO/N$$

where $$N = 101 \cdot NS + 100(NP - NS)$$

simplifying to $$N = NS + 100 \cdot NP$$

when NP>NS

When the phase is locked, FO=FREF, so the frequency of the oscillator 101 is given by:

$$FLO = FREF \cdot N$$

$$FLO = FREF(NS + 100 \cdot NP)$$

Thus a fairly simple high speed dual modulus prescaler 201 can be made to provide channel increments equal to FREF, if the Swallow counting technique is used. This is implemented in a wide variety of equipment from inexpensive consumer radios to sophisticated digital cellular telephones. The fundamental constraint is defined again by the relationship between channel spacing and the loop settling time of the phase-locked loop. Although Swallow counting greatly improves the performance of radio frequency synthesizers, greater demands are anticipated as radio communication standards become increasingly more sophisticated.

In order to achieve narrow channel spacing, the loop filter 110 must have a low frequency constant, in order to filter out the FREF component from the control signal 111 supplied to the radio frequency oscillator 101. In consumer radio synthesizer receivers, the loop settling time is not particularly important, as a delay of a fraction of a second or so for the receiving frequency to settle while tuning in a different station is unlikely to be noticed. However, in cellular telephone systems using Time Division Multiple Access (TDMA) the loop settling time may be critical.

Mobile radio transmission is subject to variations in signal strength due to reflections from obstacles such as buildings, trees and cars. The same radio signal may be received from several reflecting surfaces, resulting in constructive and destructive interference. The consequent changes in signal amplitude are known as Rayleigh fading. At any given moment in time, it is possible for some frequency channels to be rendered unusable by destructive interference.

The concept of frequency diversity is key to the solution of this and other interference problems in mobile radio systems. In the Global System for Mobile communications (GSM) specifications for digital cellular phones, frequency hopping is used, with a short transmission and reception burst occurring every 4.6 milliseconds, and each subsequent burst operating at a different frequency. Voice data is encoded in a redundant interleaved format, thus, if a particular frequency suffers interference, the missing data can be, at least partially, reconstructed from previous and subsequent bursts without communication being interrupted.

In the GSM recommendations, frequency hopping is performed on channels spaced 200 kHz apart. The greatest demand placed on the loop settling time of the frequency synthesizer is when switching from a transmission burst to a reception burst. Reception bursts might occur almost immediately after a transmission burst. Thus, every 4.6 milliseconds, there might be a short transmission burst followed almost immediately by a short reception burst. Furthermore, there is a requirement for the cellular telephone to listen to broadcast signals from adjacent cells during periods between active communication transmission or reception timeslots. The same frequency synthesizer is used to define the frequencies of transmission and reception, so it is essential for the loop settling time to be sufficiently low to meet this demand.

The GSM standard was developed with an awareness of practical difficulties of this sort and the specification is sufficiently undemanding to allow known frequency synthesizers to be used. Other telecommunications standards are presently under development. A particular constraint on satellite-based telephone systems, currently under development is the requirement for narrow channel spacing, in order to make economic exploitation of the available bandwidth viable.

Whereas GSM specifies a channel spacing of 200 kHz, suggested spacings for some satellite telephone systems are as narrow as 12.5 Khz. This extremely narrow channel spacing conflicts directly with the need for fast channel hopping, as it implies a low frequency constant for the loop filter 110, and thus a long loop settling time. While the problem may be reduced to some extent by having a separate frequency synthesizer for transmission and reception, this is expensive, in terms of cost, power consumption and physical circuit size.

Several satellite telephone systems are currently under development by the major telecommunications companies. One of these is known commercially by the trade name Iridium, established originally by Motorola. Iridium uses a number of low Earth orbit satellites, thus radio transmitters in the mobile handsets and the satellites can operate at a lower power than if high Earth orbit satellites are used. Low Earth orbit satellites have two major disadvantages in that a larger number of satellites are required per unit area of coverage and substantial variable doppler shifts are encountered as the satellite moves across the sky.

Figure 3:
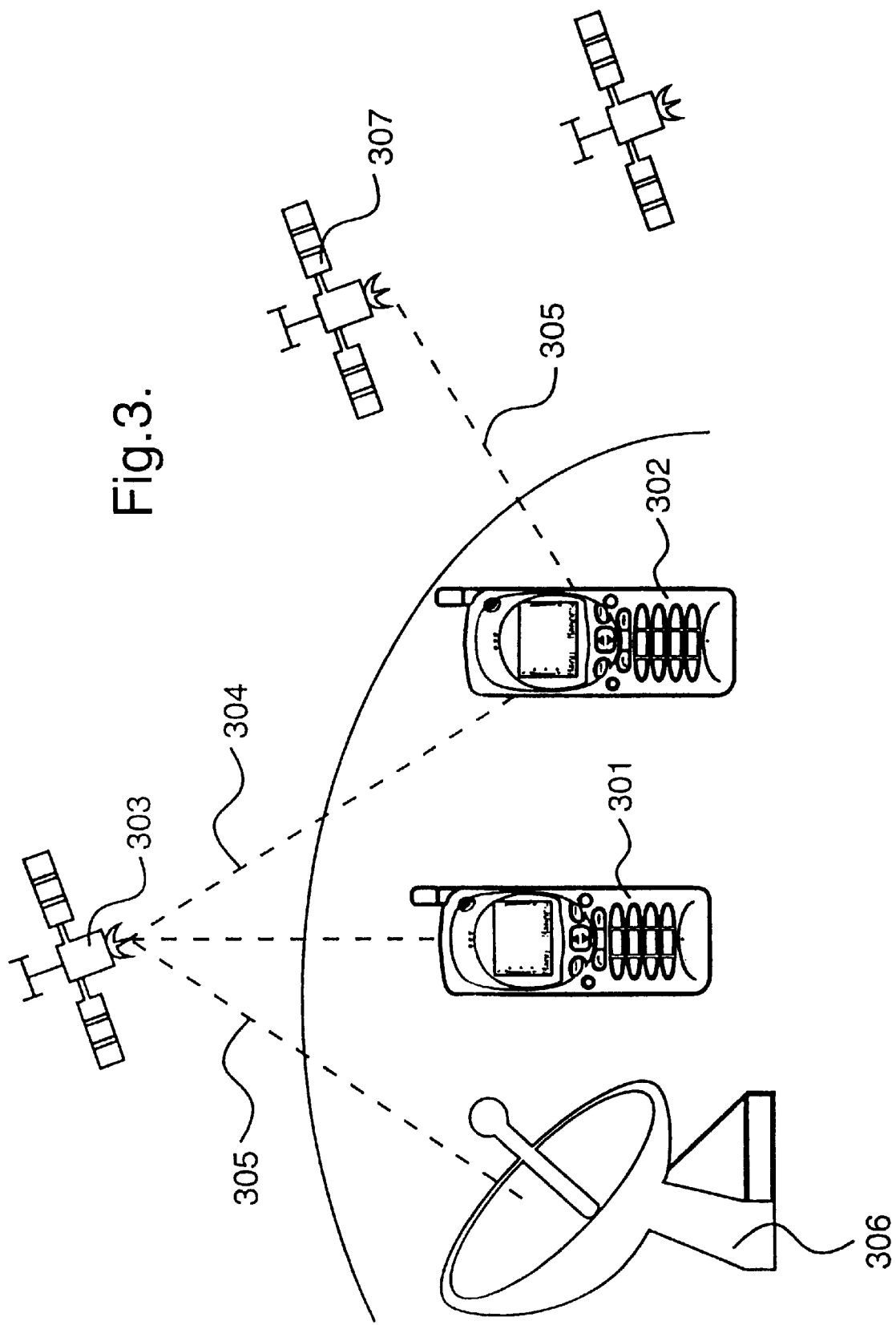
FIG. 3 shows a satellite telecommunications system, including satellites and mobile telephone transceivers.

In the satellite telephone system shown in FIG. 3, mobile handsets 301 and 302 communicate with the nearest available satellite 303, transferring data and digitized voice signals in a two way radio communication link 304 for the duration of a call. The satellite 303 combines data from several simultaneous calls in a high bandwidth communication link 305 to an Earth-bound satellite base station 306. During a call it is possible for a different satellite 307 to move closer to the handset 302 than satellite 303, in which case a new link 305 is established in order to make the best use of the available satellite resources, and to avoid the possibility of a satellite 303 moving over the horizon and breaking the link before the call has ended.

Figure 4:
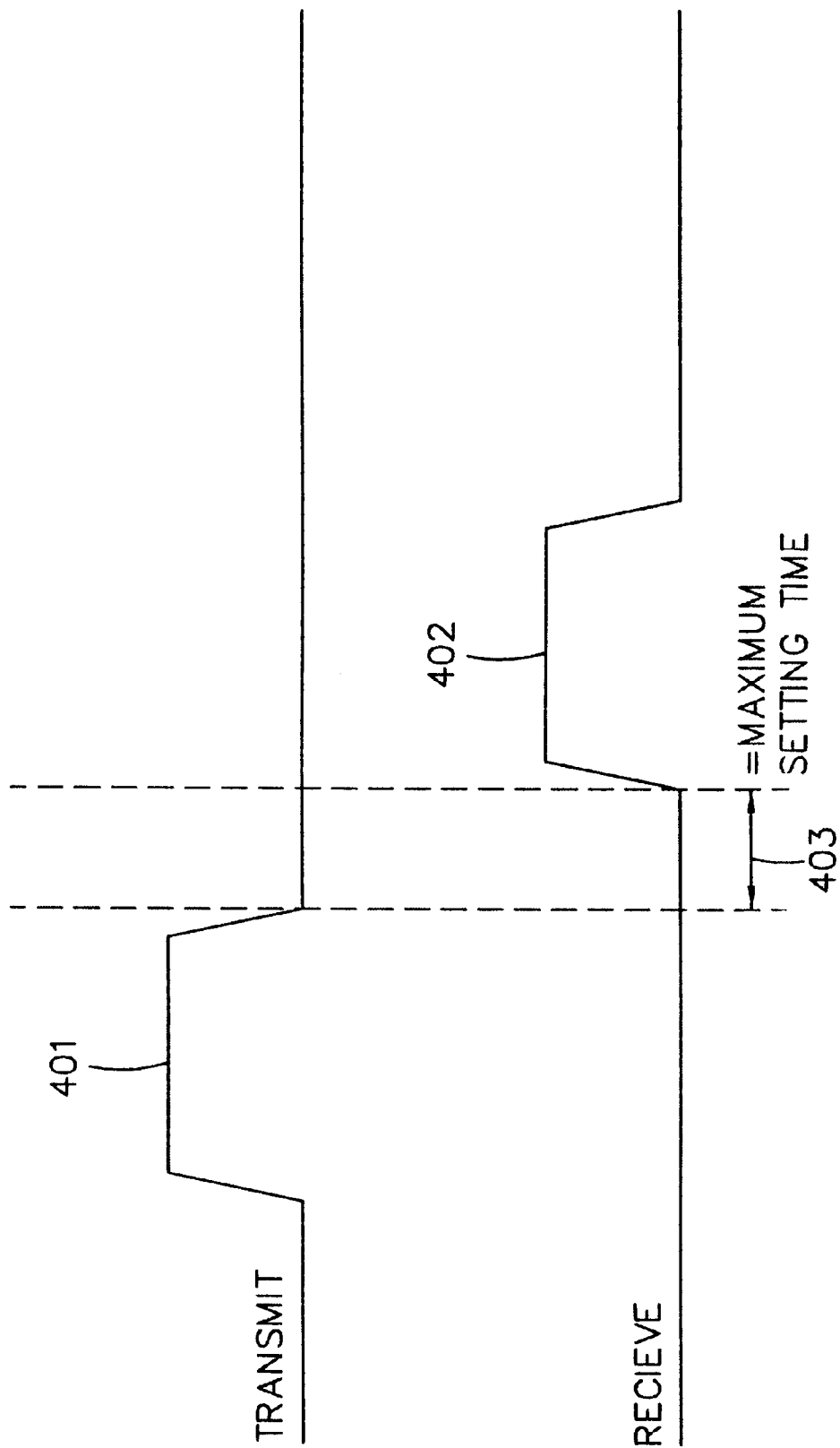
FIG. 4 shows a graph of the times required for transmission and reception between a satellite and a telephone transceiver of the type shown in FIG. 3.

Although each link 304 and 305, between a satellite 303 and 307 and mobile telephones 301 and 302, carries a simultaneous two way conversation, it is difficult to transmit and receive at the same time, as the transmitting circuit in the mobile telephone 301 would overload or even damage its own receiving circuit without sophisticated filtering. Thus transmission and reception typically occur in short bursts and at different times. Timing of transmission and reception in the mobile telephone 301 is illustrated in FIG. 4. A transmission burst 401 is followed by a reception burst 402. There is a short period 403 during which neither transmission nor reception occur, so that the various circuits can settle.

Transmission and reception bursts are repeated every few milliseconds. Speech signals are compressed into short bursts during transmission and spread out again during reception, so an uninterrupted two way conversation can take place.

Figure 5:
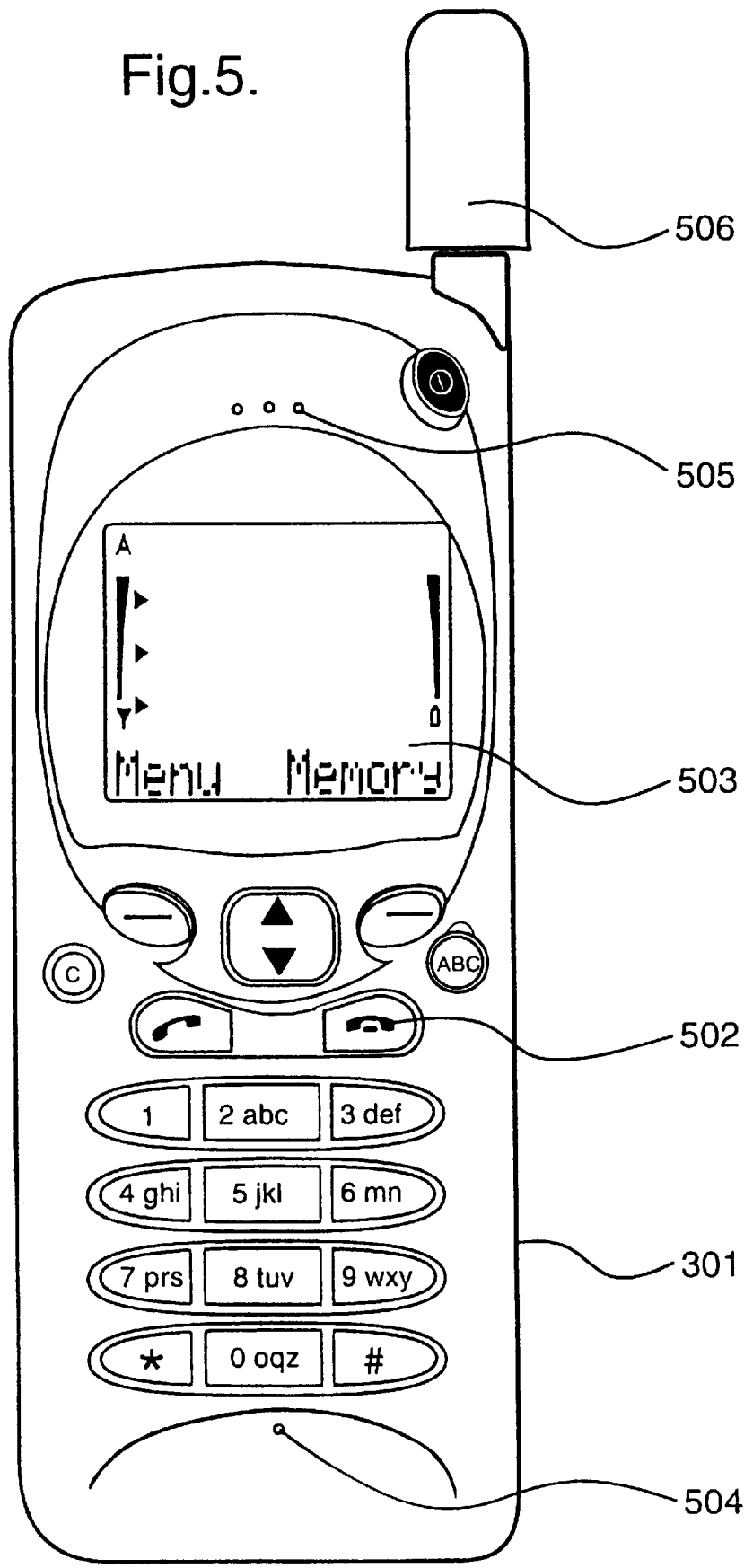
FIG. 5 shows a mobile telephone transceiver of the type shown in FIG. 3.

The satellite mobile telephone handset 301 shown in FIG. 3 is detailed in FIG. 5. Several buttons 502 enable various operations to be performed, including accepting a call, terminating a call, dialling a number, storing a telephone number in an alphabetical index, and so on. An alphanumeric liquid crystal display 503 provides an indication of the telephone's status, including such information as signal strength, remaining battery power, the number which has been dialled, and so on. A microphone 504 converts sound pressure waves into an electrical signals, and a loudspeaker 505 converts electrical signals into sound pressure waves. An antenna 506, tuned to the transmission band of two gigahertz, radiates electromagnetic waves at the transmission frequency during transmission, and during reception converts electromagnetic waves from the satellite 303 into an electrical signal.

Figure 6:
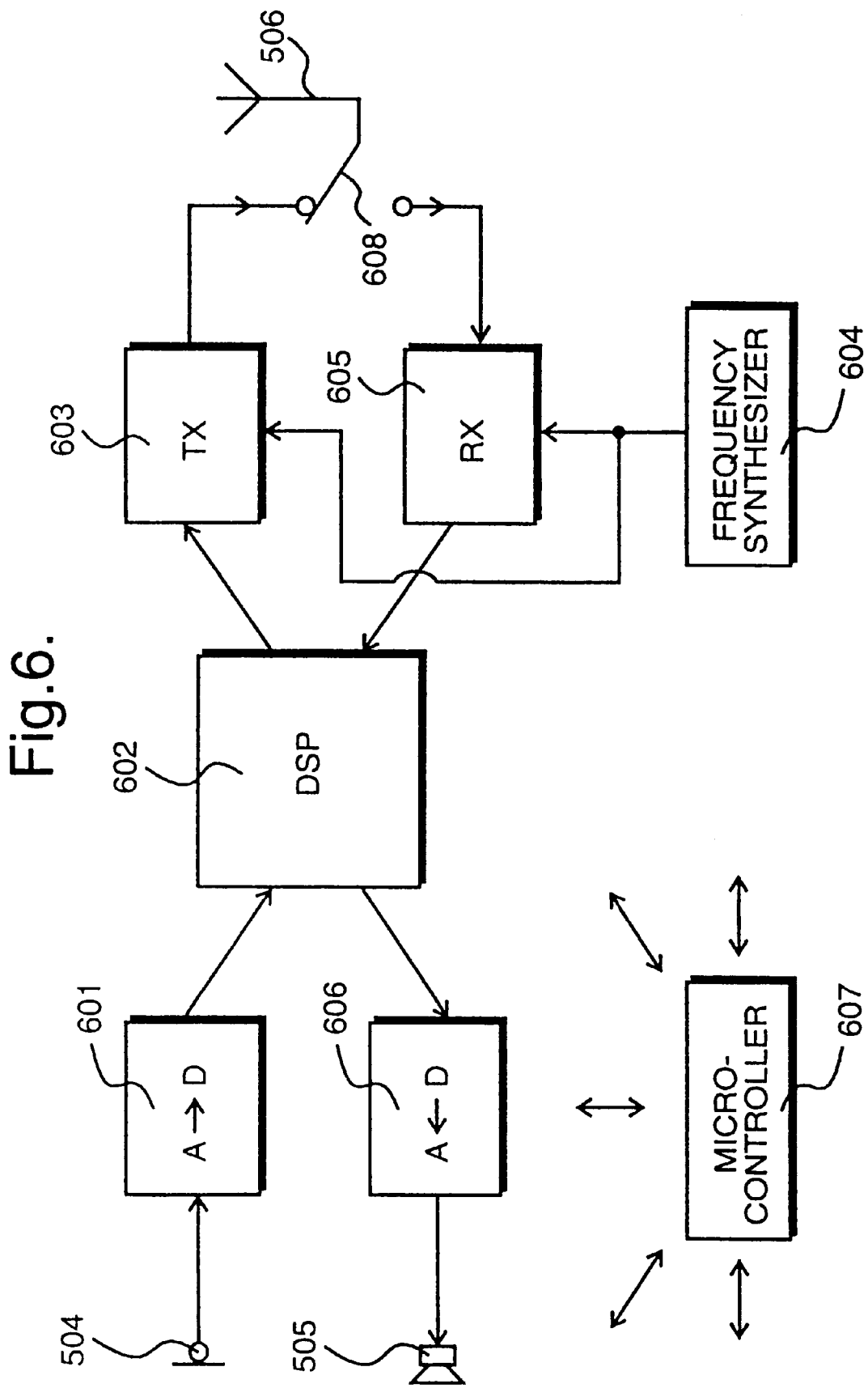
FIG. 6 shows a block diagram of the circuitry operating inside the mobile telephone transceiver shown in FIG. 5, including a digital signal processor, a transmitter and a receiver.

The main functional components of the mobile telephone 301 are shown in FIG. 6. The microphone 504 generates analog electrical signals which are supplied to an analogue to digital converter 601. The analog to digital converter 601 converts the analog signals into a stream of binary numerical values representing instantaneous analog voltages supplied by the microphone 504 at regular intervals.

Binary electrical signals representing the microphone sound pressure are supplied to a digital signal processor 602, which performs several processing functions on the sound signal before it is used to modulate a radio frequency signal. The digital signal processor 602 supplies a modulation signal to a transmitter circuit 603, which also receives a radio frequency signal from the frequency synthesizer 604. When transmitting, the output from the transmitter circuit 603 is supplied to the antenna 506 via a switch 608.

During reception, the antenna 506 supplies radio frequency signals via the switch 608 to a receiver circuit 605. The receiver circuit also receives a radio frequency signal from the frequency synthesizer 604. The receiver circuit 605 supplies signals to the digital signal processor 602, for conversion into binary electrical samples representing sound. These binary electrical samples are supplied from the digital signal processor 602 to a digital to analog converter 606, which converts these into an analog voltage. The analog voltage is supplied to the loudspeaker 505, for converting the analog signal into sound.

A microcontroller 607 is connected to the liquid crystal display 503 and the buttons 502 shown in FIG. 5. It is also connected to the digital signal processor 602, and other parts of the telephone circuit. Instructions executed by the microcontroller 607 co-ordinate circuit operations in response to user activation of the buttons 502, and signals provided by the circuit, such as battery strength and signalling information extracted by the digital signal processor 602.

In known systems the signal supplied by the digital signal processor 602 to the transmitter circuit 603 is purely a modulation signal, in other words it has a zero centre frequency and does not affect the centre frequency of the channel on which the modulation signal is to be transmitted. Similarly, the signal supplied by the receiver circuit 605 to the digital signal processor 602 is independent of the channel on which it has been received. In such a system, the frequency synthesizer 604 is responsible for controlling the selection of channel frequencies.

In known systems, switching between transmission and reception, or fast frequency hopping, requires the frequency synthesizer 604 to settle to its new frequency in a short period of time 403, as indicated in FIG. 4. When the channel spacing is 200 kHz, as is the case with the terrestrial GSM cellular network, the loop settling time of the frequency synthesizer 604 is sufficiently short using known techniques. However, in proposed standards for satellite telephone systems, the channel spacing might be as low as 12.5 kHz. This would require a much lower time constant for the loop filter in the frequency synthesizer 604, resulting in a long settling time, conflicting with proposals for the satellite system.

Figure 7:
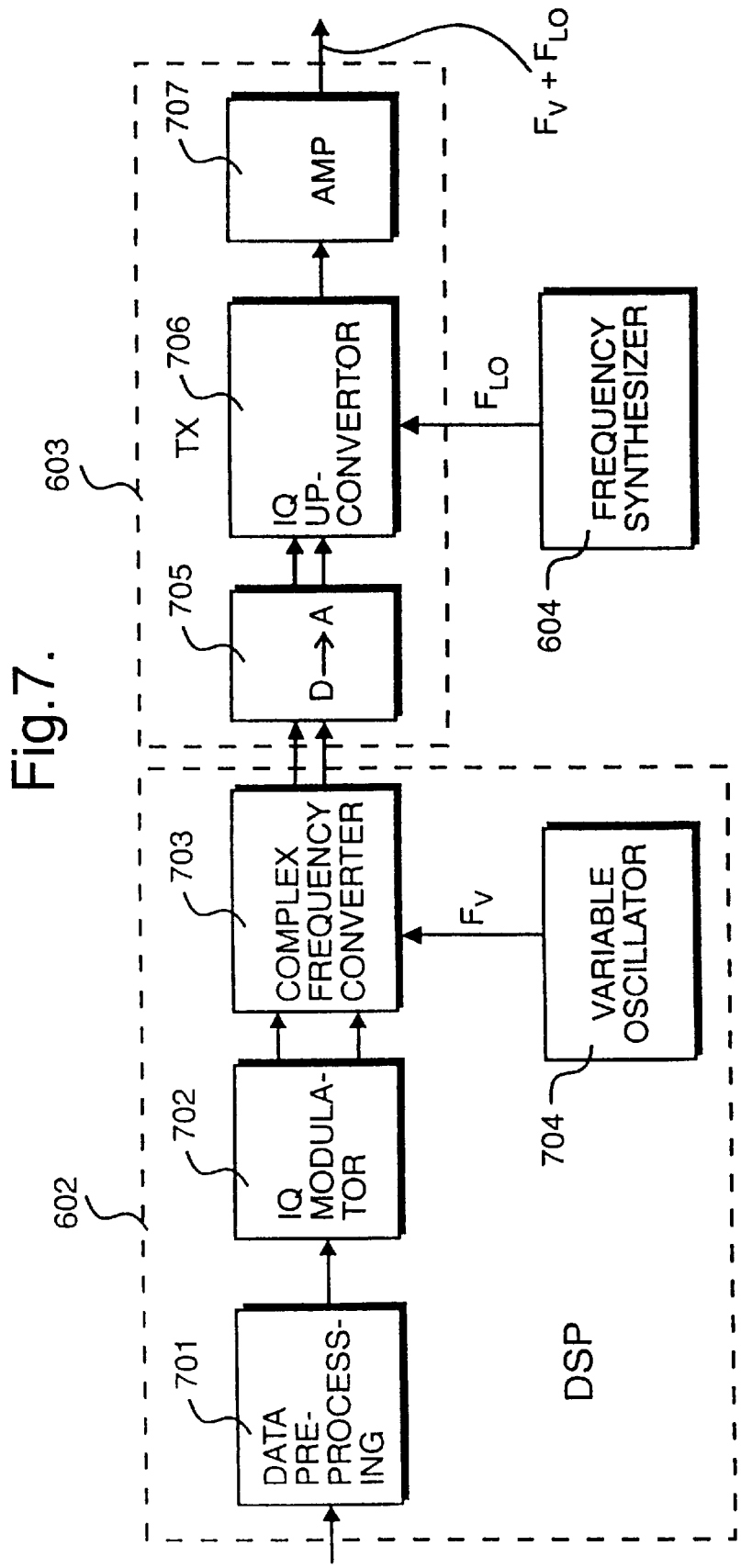
FIG. 7 details processes performed by the digital signal processor and transmitter shown in FIG. 6, including a transmitter, an IQ modulator and an IQ upconverter.

Processes in the transmission chain which overcome this problem are shown in FIG. 7. The first process performed by the digital signal processor is data preprocessing 701. This is an elaborate multi-step process which translates data from the microphone circuit, and some signalling data, into redundant, encrypted, interleaved data bursts. The data processing 701 also includes filtering, thus generating signals suitable for supplying to the next stage of the processing chain. The resulting filtered serial bit stream is supplied to an IQ modulator 702, arranged to generate a quadrature pair of signals suitable for supplying to the next stage of the process.

A complex IQ frequency converter 703 combines the output from the IQ modulator 702 with a variable oscillator 704, implemented in the digital signal processing domain. The IQ converter 703 generates a modulated signal having a digital carrier frequency equal to the frequency, FV, of the variable oscillator 704.

The transmission signal from the digital signal processor 602 is supplied to the transmitter circuit 603, which contains a digital to analog converter 705, an analog IQ upconverter 706 and a radio frequency amplifier 707. The output from the digital to analog converter 705 is an analog version of the modulated signal imposed on the carrier of frequency FV. The analog IQ upconverter 706 combines this signal with the signal from the frequency synthesizer 604, having a frequency FLO. The transmission band used for the satellite system is two gigahertz, thus the FLO is typically in the order of 2 GHz. The analogue IQ upconverter 706 generates an output signal having a carrier frequency equal to FV+FLO. In an alternative embodiment, it is possible to generate a carrier frequency equal to FV−FLO, using an alternative design for the complex frequency converter 703.

By generating a low radio frequency in the range of zero to 200 kHz using the variable oscillator 704 implemented in the digital signal processing domain, it is possible to provide virtually instantaneous very high frequency resolution, which is superimposed on a broad channel selection provided by the frequency synthesizer 604, having a channel step capability of 100 kHz. Thus the loop settling time of the frequency synthesizer 604 is not compromised by the need to provide a close channel spacing of 12.5 kHz. For example, FLO=2 GHz=2000000 Khz FV=125 kHz $FV+FLO=2000125\ Khz$ which may be instantly changed by the variable oscillator 704 in the digital signal processor 602:

FV=147.5 Khz $FV+FLO=2000147.5\ Khz$ a slightly slower change may be achieved using the frequency synthesizer 604, but this is still within the desired settling time because of its large frequency step of 100 kHz:

FLO=2000500 Khz

FV=162.5 kHz $FV+FLO=2000662.5\ Khz$ in this example both FV and FLO were changed simultaneously, to achieve a large and yet highly accurate change in channel frequency, still within the desired settling time for the frequency synthesizer 604.

The output from the analog IQ modulator 706 is supplied to a radio frequency power amplifier 707, which supplies two gigahertz signals to the antenna 506 at a power of five watts.

Figure 8:
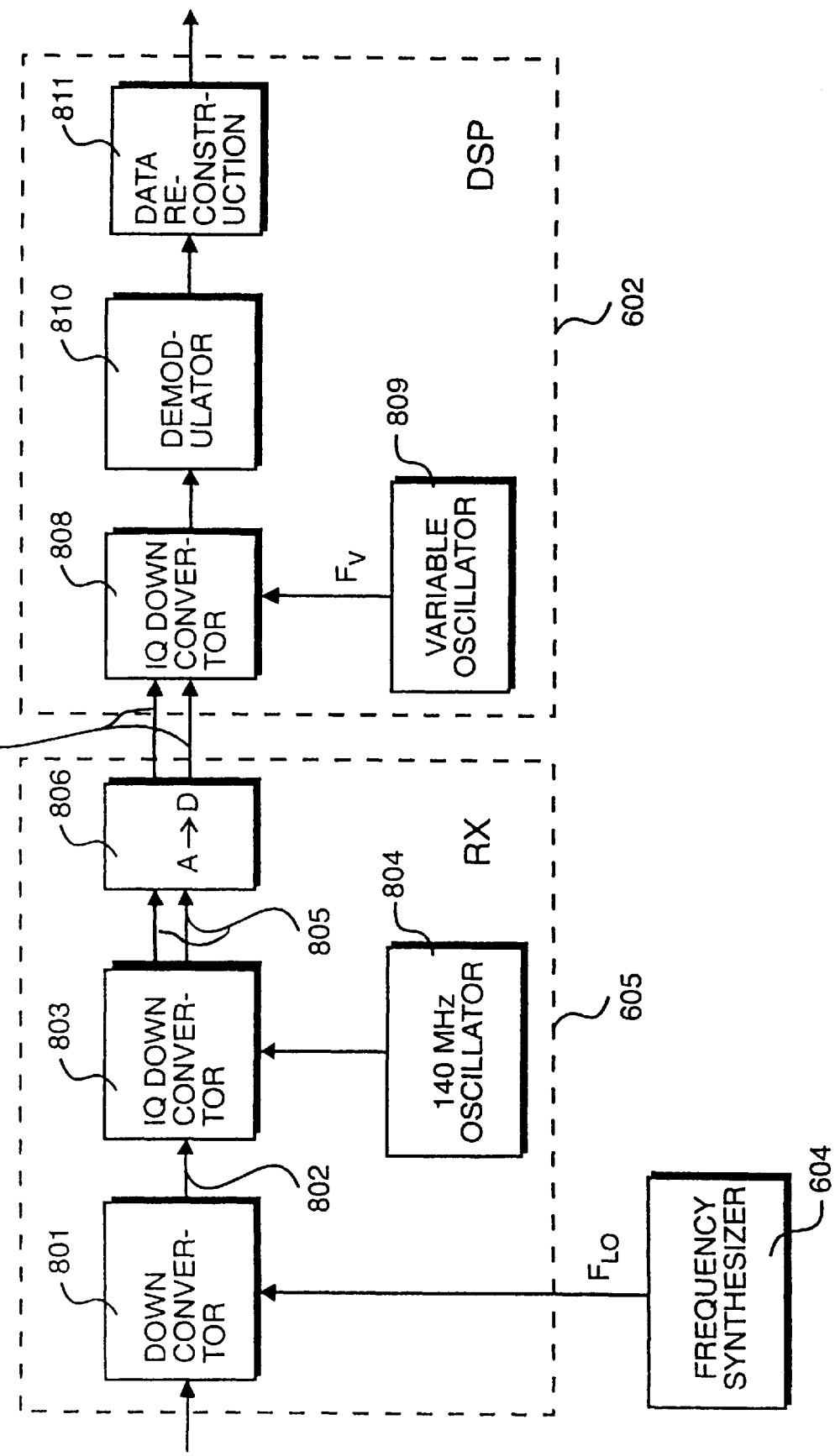
FIG. 8 details processes performed by the digital signal processor and receiver shown in FIG. 6, including an analog receiver, an IQ downconverter and a digital IQ demodulator.

The solution may be extended to reception, as shown in FIG. 8. The incoming radio frequency signal from the antenna 506 is supplied to the receiver circuit 605. A modulator pre-amplifies the incoming radio frequencies and multiplies this signal by the output of the frequency synthesizer 604, which has a frequency equal to FLO. The frequency synthesizer 604 is arranged to provide a frequency which is about 140 MHz less than the desired reception frequency. A signal 802 is thereby generated, which contains the desired signal, transposed to a carrier of 140 MHz. This technique of transposing carrier frequencies is known as superheterodyning, usually abbreviated to superhet. The purpose of this transposition is to allow further amplification of the desired signal at a carrier frequency convenient for circuit design. Typically, superhet receivers provide improved rejection of unwanted signals, as well as several other advantages.

The carrier is thus transposed to an intermediate frequency of around 140 MHz. After some amplification, this is then supplied to an analog IQ downconverter 803, which reduces the 140 MHz intermediate frequency by IQ mixing with a 140 MHz signal derived from a fixed analog oscillator 804. This results in an output signal 805. In known systems, this output would contain no channel frequency offset, or a small frequency offset due to doppler shifts arising from a relative velocity between the telephone and the satellite. However, in the preferred embodiment, the output signal 805 has been transposed to an intermediate frequency dependent on the fine channel offset in steps of 12.5 kHz. Thus the signal 805 from the analog IQ downconverter 803 requires further complex mixing with the channel offset, in order to remove it completely from the radio frequency domain.

An analog to digital converter 806 converts the analog signal 805 to a digital signal 807, which is supplied to the digital signal processor 602. The digital signal 807 is processed by a complex frequency converter 808, arranged to mix signal 807 with a signal from a variable oscillator 809, implemented in the digital signal processing domain. Thus, if the variable oscillator 809 is set to a frequency which matches the intermediate frequency in the signal generated by the analog IQ downconverter 803, the channel offset is removed and data can be retrieved by subsequent processes 810 and 811 in the digital signal processor 602. For example:

Rx frequency=2,000,125 Khz
Synthesizer output, FLO=2,140,000 Khz
First intermediate frequency 802=140,125 Khz
Second intermediate frequency 805=125 Khz
Variable oscillator 809, FV=125 Khz
retuning by +12.5 Khz:
Rx frequency=2,000,147.5 Khz
Synthesizer output, FLO=2,140,000 Khz
First intermediate frequency 802=140,147.5 Khz
Second intermediate frequency=805=147.5 Khz
Variable oscillator 809, FV=147.5 Khz Thus the received channel is selectable in small increments by changing the frequency, FV, of the variable oscillator 809. Larger steps of plus or minus 100 kHz are selectable by changing the frequency, FLO, supplied by the frequency synthesizer 604. The invention solves the problem of the loop settling time in the frequency synthesizer 604 by allowing large channel steps of 100 kHz to be used, with smaller frequency offsets of 12.5 kHz generated in the digital domain, by the digital signal processor 602.

Figure 9:
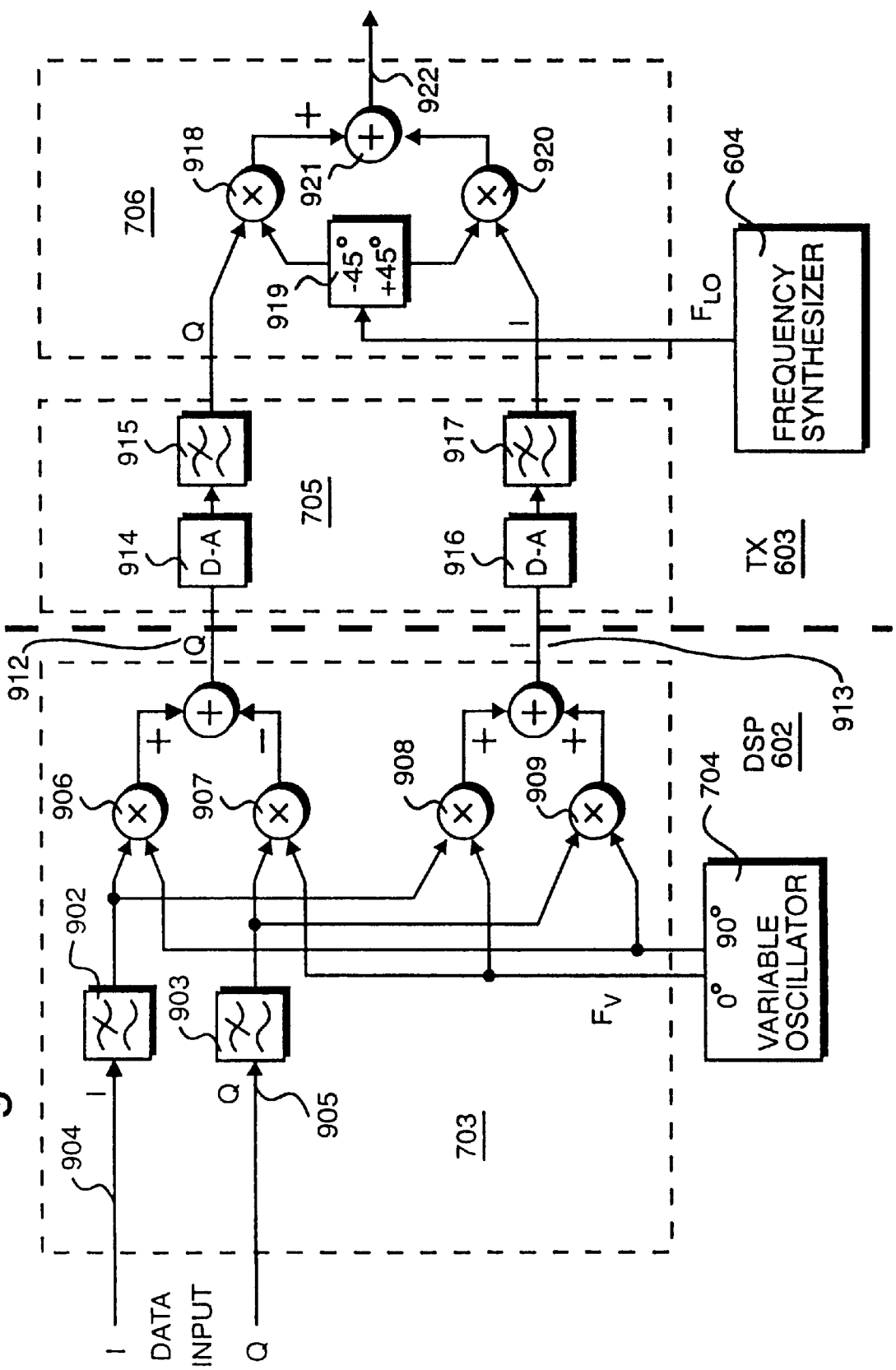
FIG. 9 details the transmitter IQ processes shown in FIG. 7, including a phase splitter.

The IQ modulation scheme used in the transmission chain shown in FIG. 7, is detailed in FIG. 9. The output from the IQ modulator 702 is a pair of I and Q signals. The frequency components in the Q signal are ninety degrees out of phase with the frequency components in the I signal. Several techniques are known for doing this in the digital domain, the most comprehensive being the Hilbert transform.

Thus the IQ modulator generates two paths 904 and 905, known as I, for immediate, and Q, for quadrature. This general approach allows further processing to be performed without the addition of an unwanted sidebands in the radio frequency domain. The I and Q signals 904 and 905 are supplied to two respective low pass filters 902 and 903, which perform a reconstruction of the digital waveform in the analogue domain, removing unwanted sample frequencies and other unwanted frequency components at the D-A output.

A complex IQ multiplier comprises four multipliers 906, 907, 908 and 909, in combination with two adders 910 and 911. The complex multiplier receives IQ signals representing the modulated data, and IQ signals from the variable oscillator 704. The result of multiplying these two pairs of signals in the discrete time domain is the addition of the two frequencies in the frequency domain, with high attenuation of unwanted sidebands. Generally, the digital I/Q processing performed in blocks 602 and 603 is implemented numerically in a digital signal processor or the like.

The resulting modulated IQ signals 912 and 913 are supplied from the digital signal processor 602 to the digital to analog converter 705 in the transmitter circuit 603. The digital to analog converter comprises two converters 914 and 916, with suitable anti-aliasing low-pass filters 915 and 917. The resulting analog IQ signal pair is supplied to the analog IQ upconverter 706, comprising two analog multipliers 918 and 921, supplied by respective analog IQ signals and an IQ signal pair derived from the frequency synthesizer 604. An analog adder 921 combines the IQ components for subsequent amplification in the radio frequency amplifier 707.

The effect of this final stage of analog IQ modulation is to superimpose the low radio frequency signal represented by the IQ components 912 and 913 upon the transmission frequency supplied by the radio frequency synthesizer 604. Again, the use of an IQ upconverter ideally cancels the unwanted sideband and carrier. In practice the attenuation is limited to 30 to 40 dB.

Figure 10:
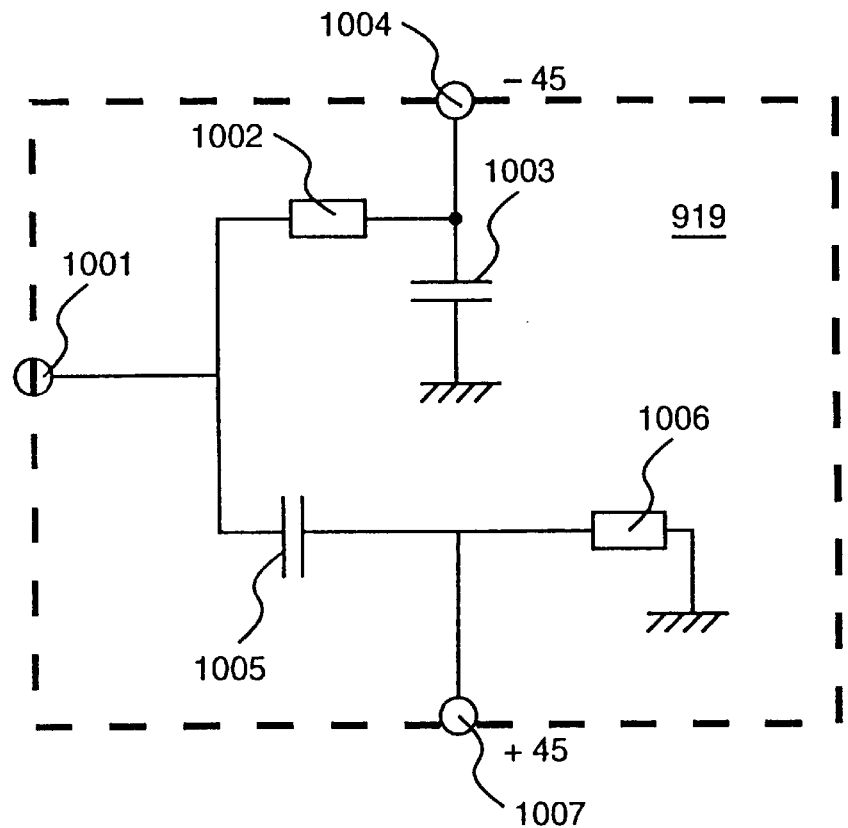
FIG. 10 details the phase splitter shown in FIG. 9.

The analog IQ upconverter 706, shown in FIG. 9, includes a phase splitter 919, for generating an IQ pair from the signal supplied by the frequency synthesizer 604. The phase splitter 919 is detailed in FIG. 10. An input connection 1001 receives the signal from the frequency synthesizer 604, oscillating at frequency FLO. This input signal is supplied to a resistor 1002 and a capacitor 1003, which form a phase lag network, having a phase lag of forty-five degrees at the centre of the range of transmissible frequencies. In this case the centre of the frequency range is two gigahertz and values for R and C may be calculated by the formula:

R=1/wC where w=2×PI×frequency

The input signal is also supplied to a capacitor 1005 and a resistor 1006, which form a phase lead network, characterised by a phase lead of forty-five degrees at the same centre frequency of two gigahertz. Thus the output connections 1004 and 1007 have a phase difference of ninety degrees.

Figure 11:
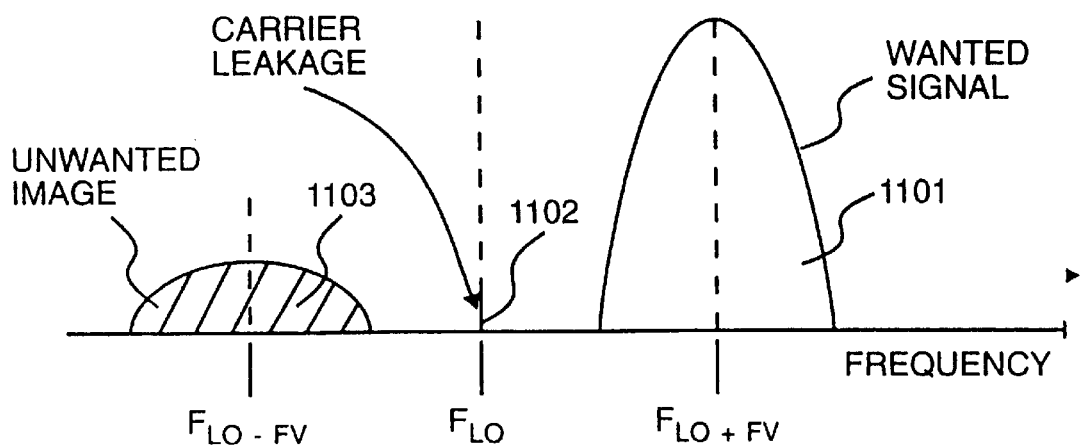
FIG. 11 details radio frequency spectra arising from non-linearities in the transmitter chain.

The use of such a simple circuit has advantages of simplified construction for use at high frequencies, but has a disadvantage of frequency-dependence. As a range of frequencies is to be transmitted, the network does not produce an exact phase shift of ninety degrees at frequencies other than those close to the centre frequency of two gigahertz. The output spectrum therefore contains small amplitudes of unwanted sidebands when the phase splitter 919 is operated at other than its central frequency. This is shown in FIG. 11.

The wanted spectrum 1101 is centred around a frequency equal to FLO, the frequency of the frequency synthesizer 604, plus FV, the frequency of the variable oscillator 704, implemented in the digital signal processor 602. Non-linearity in the phase splitter 919 and elsewhere results in carrier leakage 1102 and an unwanted mirror image 1103 of the desired frequency spectrum, centred around the value of FLO minus FV. Fortunately, in satellite communications, the wanted signal has a low variation in amplitude, due to the fact that radio signals are transmitted along the line of sight. Thus, although an unwanted image is transmitted, at twenty to thirty decibels below the desired signal, this does not interfere with reception.

Figure 12A:
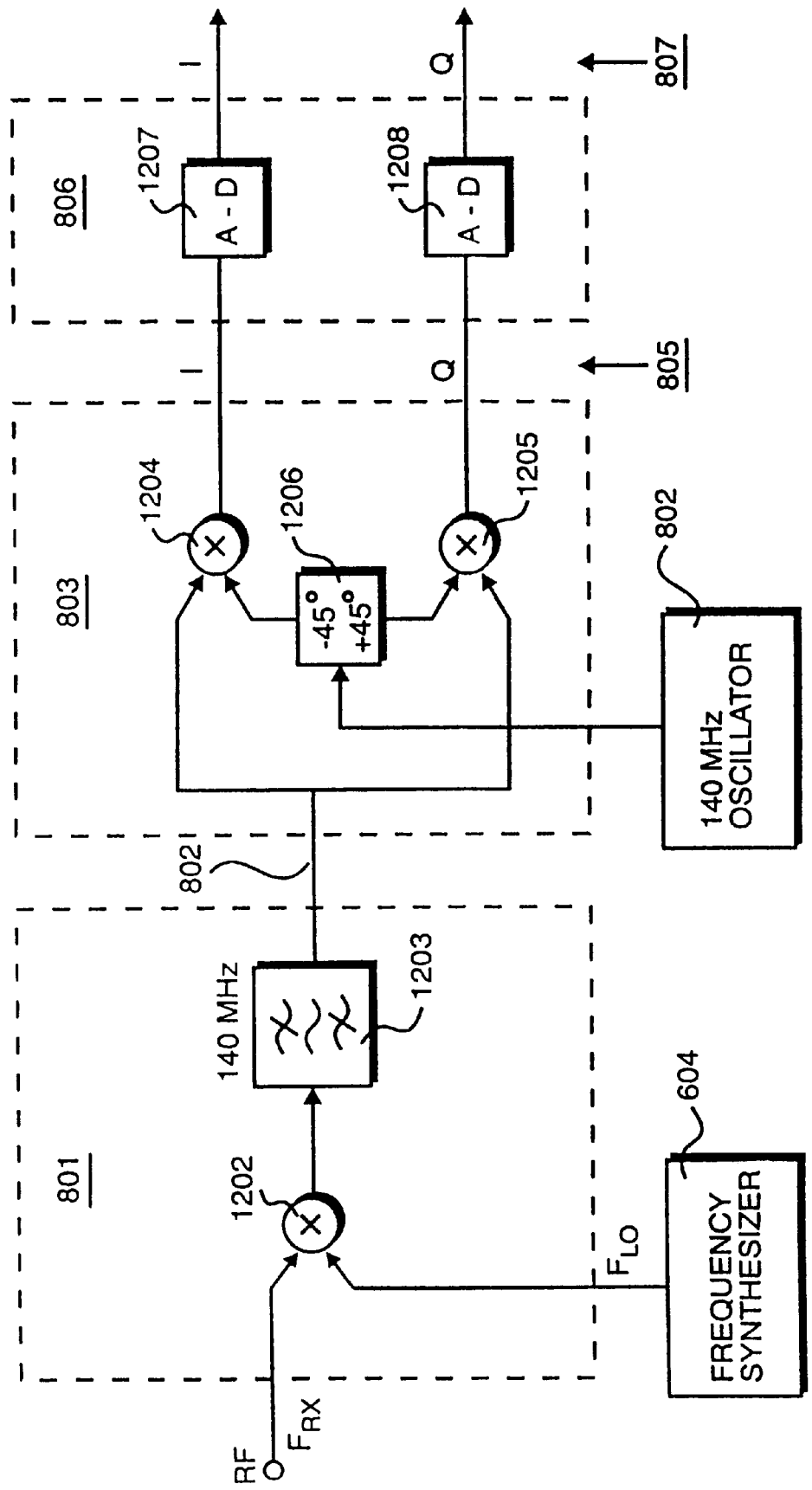
FIG. 12A details the analog receiver IQ processes shown in FIG. 8.
Figure 12B:
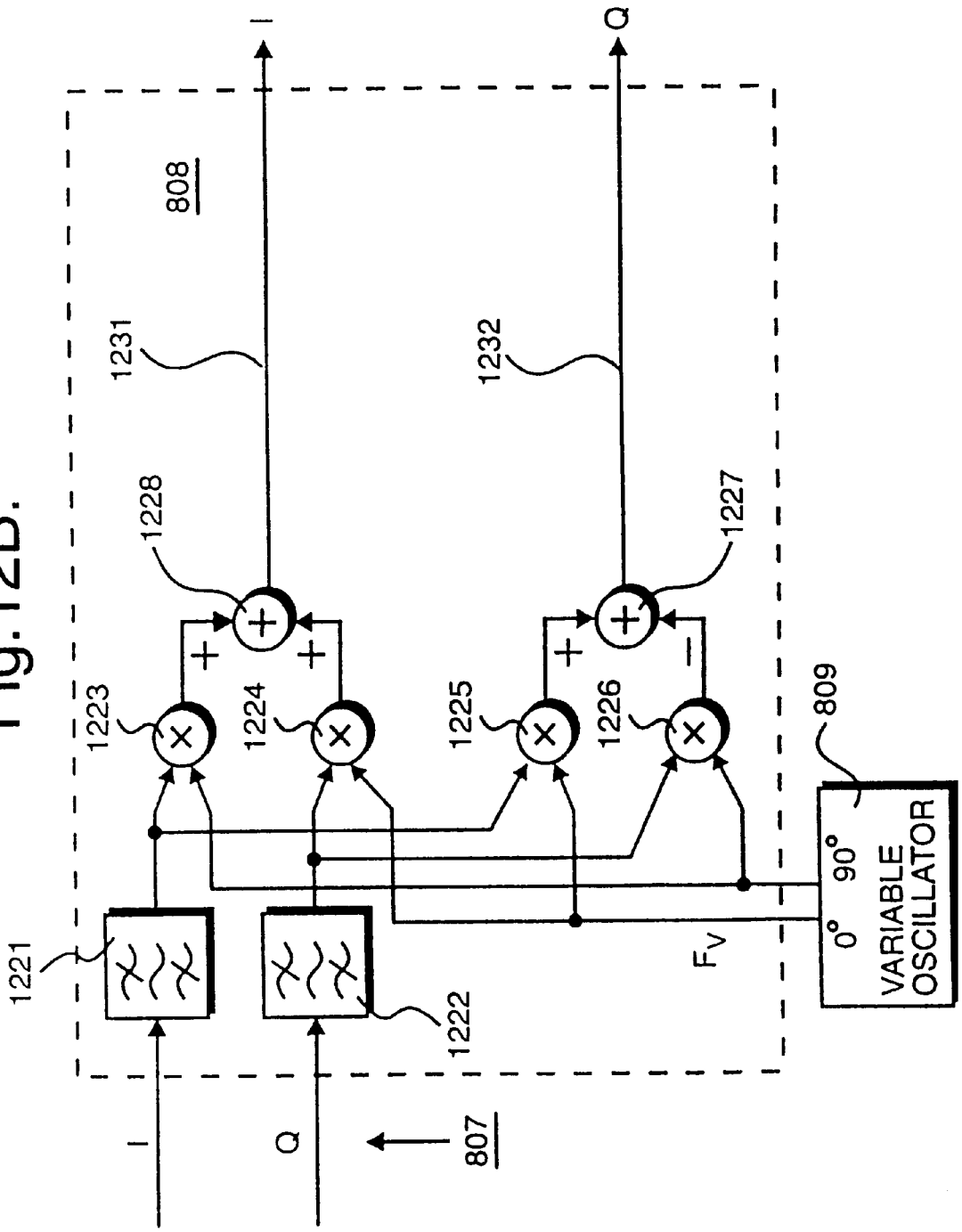
FIG. 12B details the digital receiver IQ demodulator shown in FIG. 8.

Processes for demodulating a received signal shown in FIG. 8 are detailed in FIG. 12A and FIG. 12B. In FIG. 12A, radio frequency signals from the antenna circuitry are supplied to a mixer 1202. In practice this mixer consists of an integrated Gilbert Cell type mixer. The mixer 1202 is also supplied with the signal from the frequency synthesizer 604, oscillating at frequency FLO. Frequency components of the incoming radio frequency signal are mixed with the signal from the frequency synthesizer 604, thus generating a spectrum containing the sums and differences between the two inputs supplied to the mixer 1202. An intermediate frequency amplifier 1203 is used to amplify only those frequencies resulting from mixing which have a frequency of 140 MHz. Thus by setting the frequency synthesizer to a frequency offset from the desired reception frequency by 140 MHz, a difference frequency of 140 MHz is generated which will be the only frequency amplified by the intermediate frequency amplifier 1203.

The resulting 140 MHz intermediate frequency 802 is then split into two parts and supplied to the analog IQ downconverter 803. Here, the two paths are multiplied separately by corresponding IQ components generated by a phase splitter 1206. The phase splitter 1206 operates according to the circuit shown in FIG. 10, but having plus and minus forty-five degree phase shifts at a frequency of 140 MHz, instead of two gigahertz. The signal supplied to the phase splitter is supplied by the fixed frequency 140 MHz oscillator 802. The IQ mixing is performed by multipliers 1204 and 1205, resulting in a further downwards transposition in frequency, to the range of up to a few hundred kilohertz.

In known receivers, the radio frequency carrier is removed at this stage, in other words it is converted to around zero frequency. However, this prevents the use of a sufficiently fast channel selection capability due to the design restrictions of frequency synthesizer phase locked loops. In order to ensure fast channel selection, the final stage of radio frequency downconversion is performed by the digital signal processor 602. Thus the IQ signals 805 generated by the analog IQ downconverter 803 are supplied to the analog to digital converter 806. This comprises two converters 1207 and 1208, which supply digitized I and Q signals 807 to the digital signal processor 602.

The IQ downconversion process performed inside the digital signal processor shown in FIG. 6 and FIG. 8 is detailed in FIG. 12B. The IQ signals 807 generated by the analog to digital converter 806 are supplied to respective digital band pass filters 1221 and 1222. Their outputs are supplied to a complex IQ multiplier comprising four multipliers 1223, 1224, 1225 and 1226. The complex IQ multiplier mixes the incoming IQ signals with a quadrature signal from the variable oscillator 809. This has the effect of removing the intermediate radio frequency component from the desired reception channel, resulting in the usual baseband I and Q channels for further demodulation processing. Typically, the down conversion is performed in a digital signal processor or the like.

The I and Q outputs 1231 and 1232 are supplied to the demodulator 810 and subsequent data reconstruction processes. In an alternative embodiment, the functionality of the bandpass filters 1221 and 1222 could be achieved by placing low pass filters in the paths of the I and Q outputs of the process shown in FIG. 12B.

There are several important advantages to the invention, in addition to the main one of fast channel selection, which has been described. In a low orbit satellite phone system, considerable doppler effects result from the velocity of the satellite relative to the Earth-based mobile transceiver. Thus the frequency of signals received by the mobile transceiver from the satellite is variable, as are signals received by the satellite from the mobile transceiver, and might reach the value of channel spacing. In terrestrial cellular systems, doppler shifts of up to about 1 kHz are encountered. In satellite systems, doppler shifts can be much greater than this. Typically, with low Earth-orbit systems, this doppler shift may extend to several tens of kilohertz, depending on the position in orbit at the time communications take place.

In the frequency synthesizers shown in FIG. 1 and FIG. 2, frequencies are selected in steps; there is no provision for continuously variable frequency modification, as is required to compensate for the doppler shift encountered when communicating with non-geo-stationary satellites. The known solution is to provide a modified temperature compensated crystal oscillator TCXO 108, known as a voltage controlled temperature compensated crystal oscillator, or VCTCXO. A VCTCXO includes a varicap diode in the crystal oscillator circuit, which may be controlled by an external voltage. This voltage may be used to impart the necessary frequency offset for compensating for doppler shift. Another technique is to take the low frequency offset into account in the demodulation algorithm.

Varicap diodes do not have convenient or particularly stable characteristics, which makes the design and manufacture of sufficiently predictable and stable VCTCXO modules difficult and expensive. In practice, some of the non-linearities may be overcome by including the satellite in a frequency correction dialogue:

1 Satellite transmits to handset

2 Handset transmits to satellite

2 Satellite calculates received frequency

4 Satellite transmits correction factor to handset

5 Handset corrects varicap voltage

Thus errors in the frequency of the VCTCXO may be compensated by the highly accurate frequency measuring capabilities of the satellites on-board circuitry and computers. Nevertheless, the VCTCXO represents a weak link in the design of the handset.

The variable oscillators 704 and 809 shown in FIGS. 7 and 8 are implemented on a digital signal processor, and can thus provide very high frequency resolution. This allows the master oscillator in the frequency synthesizer 604 to be of a fixed frequency type, and all doppler corrections can be performed by modifying frequency data supplied to the variable oscillators.

An additional source of difficulty when designing accurate frequency synthesizers operating in the gigahertz range, is the need to provide a reference oscillator manufactured to oscillate to a high level of accuracy. Typical these are quartz oscillators, and may provide a manufacturing tolerance of a few parts-per-million. When channels are to be selected in the gigahertz range to an accuracy of a few kilohertz, standard manufacturing tolerances become insufficient. The continuous variability of the variable oscillators 704 and 809, enables standard tolerance crystal oscillators to be used, as any frequency corrections can be performed by receiving correction signals from a satellite and modifying data supplied to the digital signal processor 602, on which the variable oscillators 704 and 809 are implemented.

A further and highly significant advantage of the invention relates to radio frequency interference generated within the mobile telephone handset itself. Traditionally a single quartz oscillator oscillating at around ten megahertz is used to control the frequency synthesizer. This high frequency is then divided down to the channel frequency spacing or a multiple of the channel frequency spacing. The quartz crystal is also used to control other parts of the circuit, providing clock pulses to the digital signal processor and microcontroller.

In many known designs, these circuits include their own phase locked loops so that a frequency convenient for communications may be generated by the quartz oscillator and other frequencies are generated internally by the digital signal processor and microcontroller, which are suitable for controlling their respective internal operations.

Thus the master quartz oscillator used in the mobile phone handset generates a signal which is distributed to several adjacent circuits. The oscillation waveform is a square wave, and contains many harmonics extending across several radio frequency ranges which are involved in the processes of reception. Radio signals received by the handset from the satellite are considerably attenuated, and a highly sensitive receiver circuit is required in order to receive signals reliably. The weakness of the received signal is such that any radio frequency components generated by the quartz crystal may interfere with the reception process.

Given a fixed frequency master oscillator, it becomes possible to predict the frequencies of harmonics which will be generated, and thus which frequencies are to be avoided as reception channels. Thus, given the improved design, where the crystal is fixed and all frequency corrections are carried out by modifying a low frequency variable oscillator in the digital signal processor, it becomes possible to specify the channels which should be used for communication. Unusable reception frequencies can be predicted by calculating integer multiples of the frequency FREF, for example 13 MHz, of the fixed master quartz oscillator:

Unusable channel=n·FREF where n is an integer

Usable reception channels are then spaced between these frequencies:

Usable channel=(n+0.5)·FREF

What is claimed is:

1. A method of processing a digital input signal for transmitting over a radio channel, comprising steps of:
   processing said digital input signal in combination with a digital modulating signal to produce a digital intermediate signal;
   converting said digital intermediate signal into an analog intermediate signal; and
   processing said analog intermediate signal in combination with an analog modulating signal to produce a radio frequency output signal, wherein the frequency of said digital modulating signal and the frequency of said analog modulating signal are independently adjusted to change the frequency of said output signal for transmitting over a radio channel.

2. Apparatus for processing a digital input signal for transmitting over a radio channel, comprising:
   processing means for processing said digital input signal in combination with a digital modulating signal to produce a digital intermediate signal;
   converting means for converting said digital intermediate signal into an analog intermediate signal; and
   processing means for processing said analog intermediate signal in combination with an analog modulating signal to produce a radio frequency output signal, including means arranged to independently adjust the frequency of said digital modulating signal and the frequency of said analog modulating signal so as to change the frequency of said output signal for transmitting over a radio channel.

3. Apparatus according to claim 2, further comprising:
   means for making the resolution of the analog modulating signal wider than a channel spacing, to facilitate rapid frequency adjustments; and
   means for selecting individual channels by a finer frequency resolution in the digital signal processing means.

4. Apparatus according to claim 2, further comprising:
   means for providing Doppler shift compensation by adjusting the frequency of the digital modulating signal in the digital signal processing means.

5. A method of processing a digital input signal for transmitting over a radio channel and of receiving and processing the received signal, comprising steps of:
   processing said digital input signal in combination with a digital modulating signal to produce a digital intermediate signal;
   converting said digital intermediate signal into an analog intermediate signal;
   processing said analog intermediate signal in combination with an analog modulating signal to produce a radio frequency output signal, wherein the frequency of said digital modulating signal and the frequency of said analog modulating signal are independently adjusted to change the frequency of said output signal;
   transmitting said radio frequency output signal over a radio channel to a radio receiver;
   receiving said radio frequency output signal as an analog input signal at said radio receiver;
   processing said analog input signal in combination with an analog demodulating signal to produce said analog intermediate signal;
   sampling said analog intermediate signal to produce said digital intermediate signal; and
   processing said digital intermediate signal in combination with a digital demodulating signal to select a transmission channel in said radio receiver, wherein said analog demodulating signal and said digital demodulating signal are independently adjusted to accommodate changes in the frequency of said received analog input signal.

6. A method according to claim 5, wherein said analog intermediate signal is processed in combination with an additional analog demodulating signal before being sampled.

7. A method according to claim 5, wherein the resolution of the analog modulating or demodulating signal is wider than a channel spacing, to facilitate rapid frequency adjustments; and individual channels are selected by a finer frequency resolution during said digital processing step.

8. A method according to claim 5, wherein the radio signals are susceptible to Doppler shifts and Doppler shift compensation is provided by adjusting the frequency of the digital modulating or digital demodulating signals in the digital signal processing domain.

9. Radio frequency transmitting and receiving apparatus, comprising:

means for acquiring a digital input signal;

first processing means for processing said digital input signal in combination with a digital modulating signal to produce a first digital intermediate signal;

converting means for converting said first digital intermediate signal into a first analog intermediate signal;

second processing means for processing said first analog intermediate signal in combination with an analog modulating signal to produce a radio frequency analog output signal for transmission;

means for adjusting the frequency of said digital modulating signal and the frequency of said analog modulating signal independently so as to change the frequency of said analog output signal;

means for transmitting said analog output signal;

means for receiving said transmitted analog output signal;

third processing means for processing said received analog output signal in combination with an analog demodulating signal to produce a second analog intermediate signal;

sampling means for sampling said second analog intermediate signal to produce a second digital intermediate signal;

fourth processing means for processing said second digital intermediate signal in combination with a digital demodulating signal to select a transmission channel;

means for independently adjusting the frequency of said analog demodulating signal and the frequency of said digital demodulating signal to accommodate variations in the frequency of said received analog output signal.

10. Apparatus according to claim 9 further comprising fifth processing means for processing said received analog output signal in combination with an additional analog demodulating signal before said second analog intermediate signal is sampled.

* * * * *